United States Patent

Drnevich et al.

[11] 4,193,854
[45] Mar. 18, 1980

[54] HEAVY METAL REMOVAL FROM WASTEWATER SLUDGE

[75] Inventors: Raymond F. Drnevich, Clarence Center; Ladislas C. Matsch, Amherst; Embar G. Srinath, Tonawanda, all of N.Y.

[73] Assignee: Union Carbide Corporation, New York, N.Y.

[21] Appl. No.: 961,253

[22] Filed: Nov. 21, 1978

Related U.S. Application Data

[63] Continuation-in-part of Ser. No. 863,924, Dec. 23, 1977, abandoned.

[51] Int. Cl.² .............................................. C02C 5/12
[52] U.S. Cl. ...................................... 204/149; 204/152
[58] Field of Search .......................... 204/149, 152, 157

[56] References Cited

U.S. PATENT DOCUMENTS

| | | | |
|---|---|---|---|
| 1,194,000 | 8/1946 | Dobyns et al. | 204/152 |
| 3,304,353 | 2/1967 | Duncan et al. | 264/515 |
| 3,464,814 | 9/1969 | Jackson et al. | 75/101 R |
| 3,642,435 | 2/1972 | Allen et al. | 423/41 |
| 3,806,435 | 4/1974 | Ohta et al. | 204/149 |
| 3,869,360 | 3/1975 | Kane et al. | 204/105 M |
| 3,899,405 | 8/1975 | Iverson et al. | 204/149 |
| 3,926,754 | 12/1975 | Lee | 204/152 |
| 3,970,531 | 7/1976 | Recht | 204/152 X |

Primary Examiner—Arthur C. Prescott
Attorney, Agent, or Firm—John C. Le Fever

[57] ABSTRACT

Insoluble heavy metal sulfides in activated sludge are converted by biochemical oxidation to soluble sulfates, followed by deposition of metals on cathode from sludge as electrolytic bath.

11 Claims, 4 Drawing Figures

HEAVY METAL REMOVAL FROM WASTEWATER SLUDGE

CROSS REFERENCE TO RELATED APPLICATION

This application is a continuation-in-part of application Ser. No. 863,924 filed Dec. 23, 1977, now abandoned.

BACKGROUND OF THE INVENTION

1. Field of the Invention

This invention relates to a method for removing heavy metal from activated sludge.

2. Description of the Prior Art

With the continued improvement and growth of wastewater treatment facilities, the quantity of activated sludge produced and the problems associated with its disposal have grown commensurably. Moreover, it is now recognized that because of this growth in the quantity of sludge, many of the more commonly used methods of sludge disposal may need to be more stringently controlled or limited in order to prohibit further environmental pollution. Although the total sludge volume is usually less than 1 percent of the total treated sewage stream, it has been estimated that between 25 and 65 percent of the total capital and operating costs for primary and secondary wastewater treatment systems are expended on sludge handling and subsequent disposal. For these reasons, improvements in sludge handling and disposal methods are being actively pursued.

One method of activated sludge disposal used extensively by coastal cities, ocean dumping, has received severe criticism in recent years because of its detrimental effect on the quality of the marine environment. Accordingly these cities are searching for an economic alternative to this sludge disposal method. One option available to them is land spreading. However, the use of land spreading as a final disposal method requires a sludge that is stabilized as well as pasteurized and essentially free of toxic heavy metals. Pasteurization is a reduction in the concentration of pathogenic organisms in the sludge. As used herein, "heavy metals" are those polyvalent metals commonly referred to as the transition elements, including such metals as cadminum, chromium, copper, mercury, nickel, lead and zinc.

Heavy metals are concetrated in the waste sludges of activated sludge processes by primarily two mechanisms, chelation and chemical precipitation. Since high concentrations of heavy metals are detrimental to plant and animal life, these metals must be removed prior to land disposal of the waste sludge.

When metals are concentrated by chelation, an equilibrium exists between the dissolved heavy metals and insoluble organo-metallic complexes. In order to remove the heavy metals from the sludge and make the sludge suitable as a soil amendment material, the equilibrium of the system must be shifted so that there is a net transfer of heavy metals from the insoluble complex to the soluble form. The most common means for achieving this transfer are by acid addition to lower the pH whereby the metals are displaced with hydrogen ions, the addition of a soluble chelation agent whereby the organo-metallic bonds are broken and the metals form stronger complexes with the soluble chelation agents, or a combination of the two. The sewage sludge is then dewatered and the heavy metals are subsequently precipitated from the liquid phase.

This approach to heavy metals removal ignores some of the sludge heavy metal content present as a chemical precipitate. As a result, in many cases the heavy metal content of the dewatered sludge treated in this manner would still exceed governmental guidelines. The quantity of metals removal by this approach is also limited by the completeness of the dewatering step. Because of their inherent compressibility, biologically produced sludges are typically difficult to dewater. Such dewatering requires expensive dewatering equipment and expensive flocculant aids to achieve maximum solids recovery. Even with the most advanced technology, solid concentrations are still limited to about 30 percent. The requirement of large quantities of acid or chelaton agents for solubilization of the organo-metal chelates also places a severe economic burden on the heavy metals removal system. For these reasons, this approach does not offer a practical solution to the problem of heavy metals removal.

Heavy metals may also be concentrated in activated sludges as insoluble hydroxide, carbonate and sulfide precipitates. Because of the typical pH of most wastewater sludges (i.e., between 6 and 8), the amount of heavy metal carbonates and hydroxides formed are minimal. The metal sulfides are of major concern because they are highly insoluble, finely distributed and cannot be separated from the solid biomass. The normal procedure to reduce sulfides is to oxidize the material either chemically or biochemically. Such oxidation converts the insoluble heavy metal sulfides to the soluble sulfate species.

Allen et al, U.S. Pat. No. 3,642,435 describes a method of chemically oxidizing metal sulfides. A metal sulfides-containing ore is finely ground and mixed with water to form a slurry. The slurry is heated to between 175° F. and 250° F. and contacted with an oxygen-containing gas at above atmospheric pressure to convert the metal sulfides into water-soluble metal sulfates. The liquid phase is then recovered and subsequently treated for metals removal.

Duncan et al, U.S. Pat. No. 3,304,353 describes a method of biochemically oxidizing metal sulfides. A metal sulfide-containing ore is finely ground and mixed with water to form a slurry. This slurry is acidified to a pH ranging between 1.5 and 3.0. Bacteria, being recycled from a later stage of the process, and nutrients are added to this acidified slurry of ground ore as it passes to a fermentation tank. The bacteria comprises a relatively pure culture of *Thiobacillus ferrooxidans,* which is a certain type of bacteria capable of oxidizing sulfide in combination with metals at the recited low pH conditions. In the Duncan et al fermentation tank, air is introduced to provide oxygen for the bacteria and is agitated to facilitate their contacting the sulfide ore. The product of the fermentation tank is passed to a gravity separator which removes the particulate material from the liquor. Depending on the extraction achieved, the particulate material so recovered may be discarded or may be reground prior to further bacterial leaching. The liquid portion of the slurry, still containing a large amount of bacterial cells, may then pass to a bacterial separator or directly to a metal recovery stage where the metal is removed from solution by electrical or chemical deposition. The bacterial cells are preferably recovered and returned to the fermentation tank. In this way, as new batches of minerals are repeatedly brought into contact with the bacteria, the organisms adapt or mutate to achieve maximum utilization of both ferrous iron and sulfide. According to Duncan et al, not only is the rate of metal leaching increased but the time period which elapses before leaching begins is virtually eliminated.

Neither of the aforesaid methods of removing heavy metal sulfides from an ore, however, suggest to one skilled in the wastewater treatment art, the necessary conditions for removing heavy metal sulfides from sewage sludges. Unlike the Allen et al and Duncan et al methods, the heavy metals in a sewage sludge are typically at such low concentrations that the value of the heavy metals recovered does not offset the costs associated with their recovery. For this reason, processes as Allen et al which require considerable heating of a dilute slurry to an elevated temperature cannot be economically justified. In a similar fashion, the cost of acidifying the dilute sludge to a pH in the range of 1.5 to 3.0 as taught by Duncan et al, is also prohibitive.

The Duncan et al process is concerned with cultivating a specific culture of aerobic bacteria capable of oxidizing metal sulfides. These bacteria must be maintained at a pH or between 1.5 to 3.0 to thrive. This condition is not suitable for the growth of the typical microbial cultures normally present in wastewater sludge treatment processes.

In addition to heavy metals removal, one additional requirement in treatment of sewage sludges is sludge volatile solids reduction and, in cases where land spreading is the final means of disposal, pasteurization. Unless the volatile solids are reduced prior to disposal, the sewage sludge will still contain enough biodegradable solids to undergo putrefaction upon setting. The aeration and agitation step of the Duncan et al process would not produce significant volatile solids reduction because of the low pH characteristic of this step. As previously recited, the microbial species capable of reducing the biodegradable portion of sewage sludges by aerobic and anaerobic digestion do not proliferate at low pH conditions. Furthermore, treatment of the dewatered residue of the Duncan et al process by such microbial species is also prohibited for the same reason. Prior to such treatment, the residue must be treated with an appropriate caustic solution to increase the pH and make the sludge amenable to further treatment.

Both of these ore treatment processes also require a dewatering step to separate the soluble heavy metal-containing liquid from the solids. As stated previously, biologically produced sludges, because of their inherent compressibility, are typically difficult to dewater. Such dewatering is expensive and the ultimate solids concentration of the dewatered cake is limited by present echnology to around 30 percent. Obviously, the quantity of heavy metals removed would be limited by the completeness of this dewatering step.

It is an object of this invention provide a method for removal of heavy metals from activated (sewage) sludges which does not require addition of large quantities of chemicals, heating for operation at elevated temperature, or dewatering.

As will be explained in detail hereinafter, this invention accomplishes these objects while simultaneously achieving volatile solids reduction and most instances without requiring significant quantities of chemicals for pH adjustment and other purposes.

SUMMARY

This invention pertains to a method for removal of heavy metals from activated sewage sludge.

Briefly, the heavy metal removal method of this invention comprises aerating the activated sewage sludge with oxygen-containing gas as the sole source of oxygen to biochemically oxidize heavy metal sulfides to the soluble sulfate form, establishing and maintaining a voltage difference between a cathode and an anode in the soluble heavy metal sulfate-containing sludge as an electrolytic bath, maintaining said bath in an acidic and an aerobic condition and depositing heavy metals at the cathode, and separating digested and metal-depleted sludge from the electrolytic bath.

This invention overcomes the previously discussed limitations of prior art heavy metal removal processes.

It has been determined that the microorganisms necessary for the biochemical oxidation of metal sulfides in sewage sludge to soluble sulfates are active in the conventional aerobic digestion process and it is not necessary to acidify the sludge to a pH in the range of 1.5 to 3.0 while simultaneously inoculating the sludge with a culture of *Thiobacillus ferrooxidans*. In fact, sufficient biochemical oxidation of the insoluble metal sulfides occurs simultaneously with the desired volatile solids reduction in the sludge. Additionally, the soluble metals are electrolytically removed from the sludge in situ and it is not necessary to dewater the sludge solid-liquid mixture prior to removal of the heavy metals.

As used herein, "acidic condition" in the electrolytic bath means a pH of less than about 7, so that if the aeration is performed separately from the electrolysis and at pH above 7, adjustment is necessary as for example by acid addition.

IN THE DRAWINGS

Figure 1:
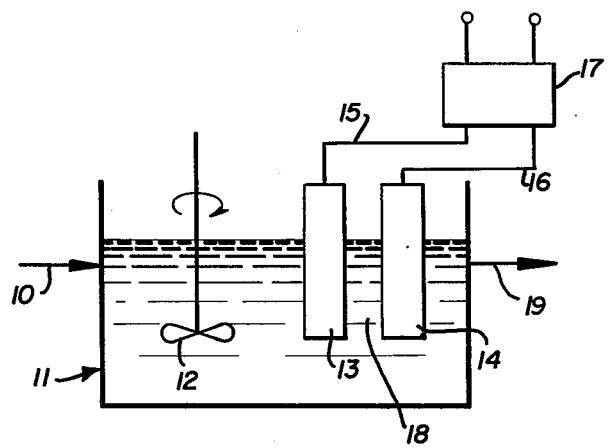
FIG. 1 is a schematic drawing of apparatus suitable for practicing one embodiment of the invention wherein sludge is aerobically digested with atmospheric air, and metal is deposited on a cathode in a single tank.
Figure 2:
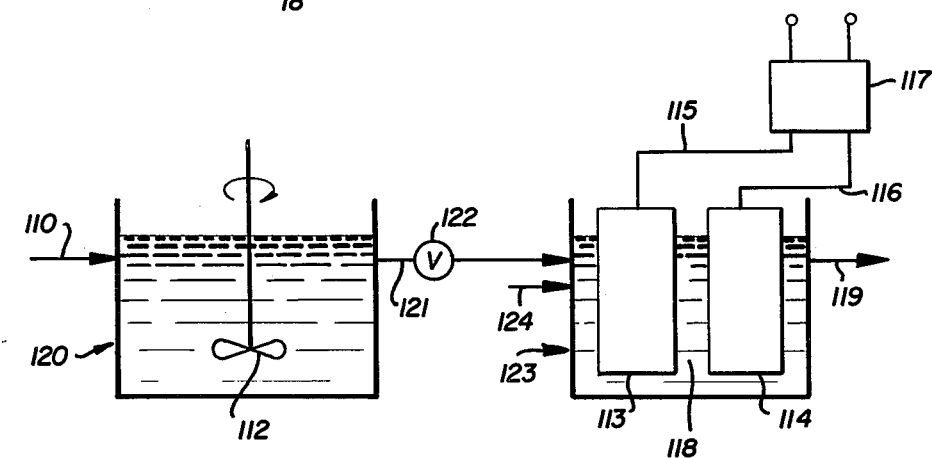
FIG. 2 is a schematic drawing of apparatus for practicing another embodiment featuring sequential aerobic digestion and electrolytic treatment in separate tanks.
Figure 3:
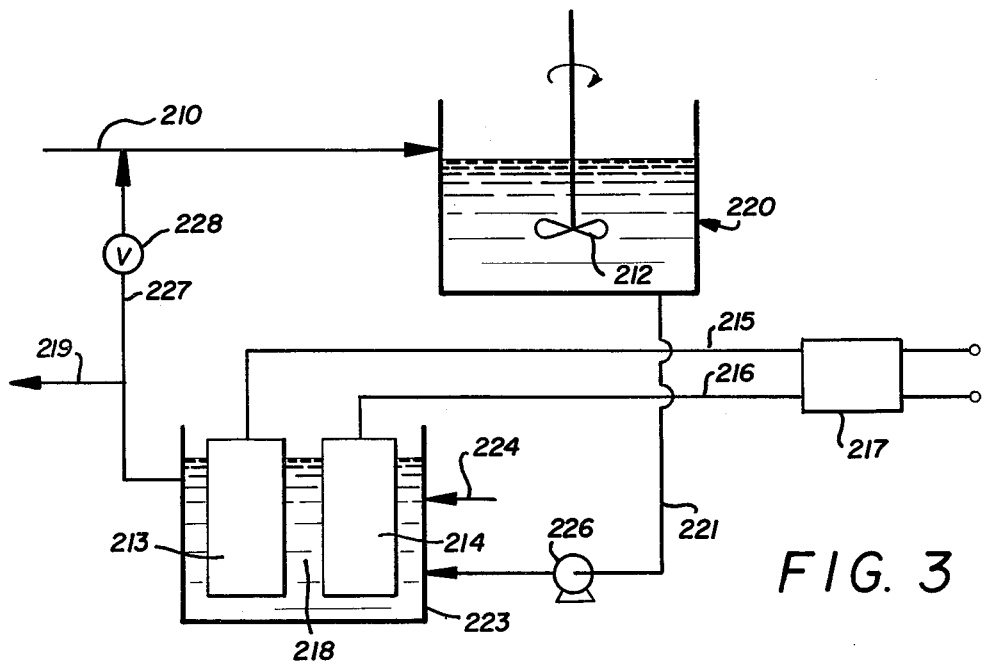
FIG. 3 is a schematic drawing of apparatus for practicing still another embodiment featuring a relatively large aerobic digestion tank, a relatively small tank for the electrolylic bath and means for recycling the heavy metal-depleted sludge from the electrolylic bath to the aerobic digestion.
Figure 4:
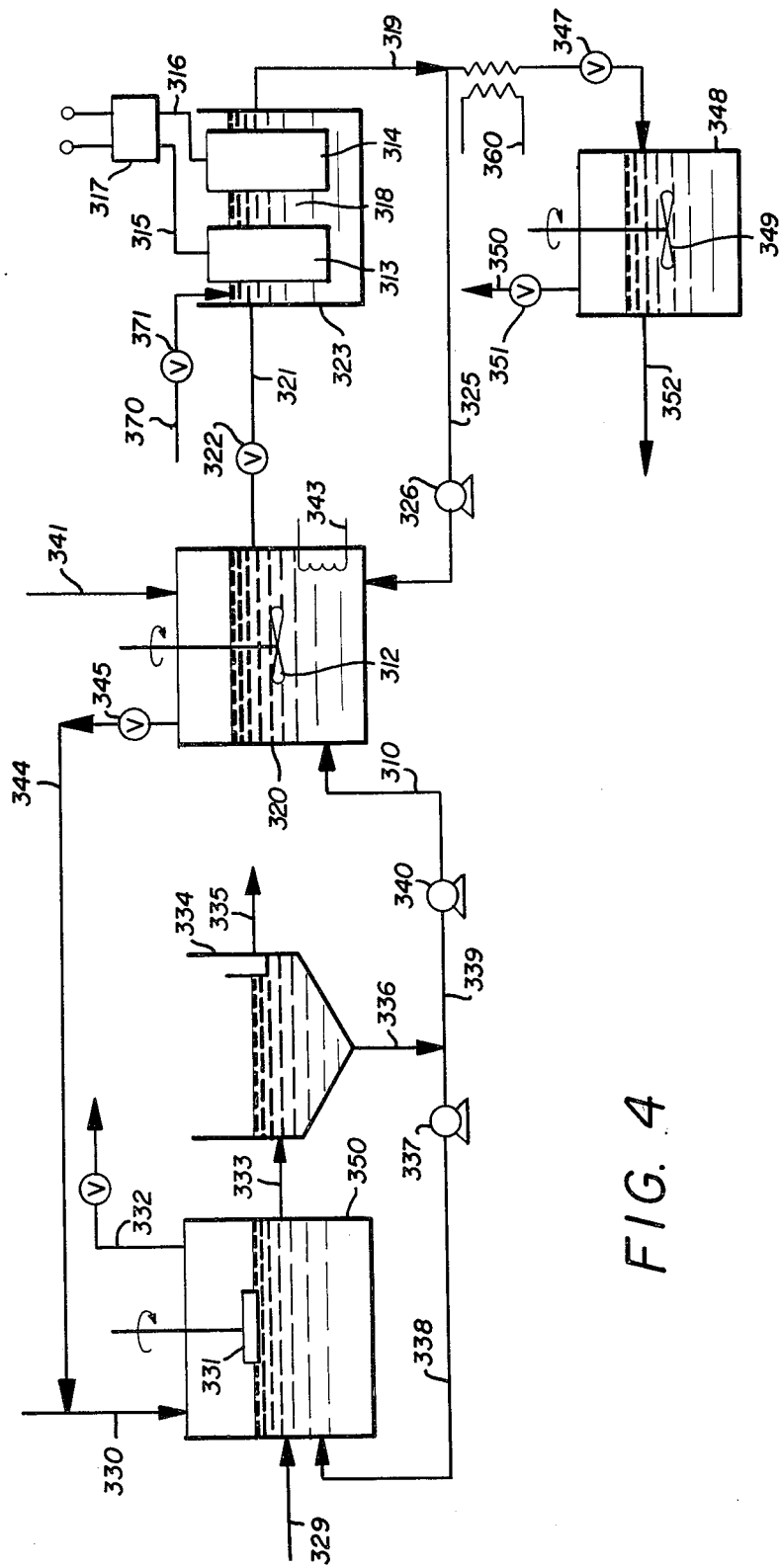
FIG. 4 is a schematic drawing of apparatus for practicing a further embodiment of the invention including thermophilic aerobic digestion, electrolylic treatment, and then anaerobic digestion.

In FIGS. 2, 3 and 4, corresponding elements to those in FIG. 1 have been identified by numbers with the same last two digits.

DESCRIPTION OF PREFERRED EMBODIMENTS

Referring now to FIG. 1, one embodiment of this invention featuring the steps of aerobic digestion with atmospheric air, and heavy metal deposition in a single tank will be described. An activated sludge originating from any known sludge producing source, such as a primary settling tank, the secondary settling tank of an activated sludge process, a trickling filter or a combination thereof is introduced into tank 11 through conduit 10. The sludge is simultaneously mixed and aerated in a manner well-known to one of ordinary skill with mechanical agitator 12. Preferably, air is mixed into the sludge in tank 11 at a sufficient rate to dissolve at least 0.03 lb. of oxygen per each lb. of volatile suspended solids in the sludge fed to tank 11. The aerobic digestion process biochemically oxidizes the heavy metal sulfides contained in the sludge to the soluble sulfate species. In addition, the aerobic treatment decreases the volatile solids content of the sludge thereby preparing it for subsequent disposal methods. The sludge is maintained in tank 11 for a sufficient time to achieve the requisite oxidation of metal sulfides, e.g., 1 day.

In addition to serving as the biochemical oxidization zone, tank 11 also functions as an electrolytic cell and contains electrodes 13 and 14. Electrode 13 serves as the cathode and electrode 14 serves as the anode. These electrodes may be constructed of conventional electrode materials. For example, the anode 15 may be formed of porous carbon or graphite, while the cathode 13 may be constructed of copper. Direct electric current is supplied to the cathode 13 through wire 15 which is connected to the alternating current rectifier 17. The rectifier is in turn connected to a suitable source of alternating current. Anode 14 is connected by wire 16 to rectifier 17.

The aerobically digested sludge is subjected to electrolytic treatment in the electrolytic bath 18 between electrodes 13 and 14. In the invention, the sludge contained in tank 11 functions as the electrolytic bath. By utilizing current supplied by rectifier 17, soluble heavy metals in the sludge are precipitated (deposited) on the cathode 13. It is postulated that the heavy metals are deposited at the cathode in either the elemental or sulfide form. Preferably, the voltage across the electrodes is maintained at a low level e.g., between about 2–3 volts dc so as to minimize the use of electrical energy through electrolysis. The electrodes 13 and 14 are preferably maintained in close juxtaposition to produce and maintain a high current density therebetween. However, the electrodes must not be so closely spaced so as to result in plugging of the space by the solid component of the sludge. Such plugging would severely inhibit the electrodeposition of the heavy metals.

The removal of heavy metals from the activated sludge according to this invention probably results from a sequence in which the insoluble metal sulfides contained in the sludge are biochemically oxidized during the aerobic digestion step to soluble metal sulfates. A large portion of the soluble heavy metal species form complexes with insoluble organic constituents of the sludge and thus may not be electrolytically removed at this stage. These chelate species are in equilibrium with the soluble cationic metal species as indicated by the following general relationship:

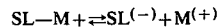

$$SL-M+ \rightleftharpoons SL^{(-)}+M^{(+)}$$

The distribution of the heavy metals between the chelate and ionic species in the aerobically digested sludge can be altered by changing the pH of the slurry. By depressing the pH to acidic conditions, the heavy metals are forced towards the cationic species according to the following equilibrium relationship:

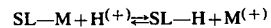

$$SL-M+H^{(+)} \rightleftharpoons SL-H+M^{(+)}$$

The heavy metals content of the liquid phase is then steadily decreased by continuously removing the soluble metal ions by electrodeposition. As the heavy metal ions are removed, the equilibrium conditions are disturbed and additional heavy metal ions are released from the solid phase into the liquid phase due to the tendency to maintain equilibrium in the distribution of metals between the two phases of the sludge. The process of electrode deposition may produce a gradual rise in the pH of the electrolytic bath 18. As a result, it may be necessary to monitor the pH of tank 11 and make suitable additions of an acidic medium, e.g., sulfuric acid, to maintain the electrolytic bath acidic. However, depending upon the pH of the influent sludge in conduit 10 and the quantity of heavy metals to remove, there may be no need for pH monitoring and adjustment of the electrolytic bath. Preferably, the pH of the sludge slurry in tank 11 of this embodiment is maintained above about 5 since below this level the activity of the aerobic bacteria is significantly reduced.

The the contents of tank 11 are monitored for pH control, it should be done in a small side stream removed from and returned to the tank since the presence of electrodes 13 and 14 may interfere with the operation of the pH monitoring device.

Depending upon the quantity of metals to be removed, the pH of the electrolytic bath may be allowed to increase to a level of about 7. Otherwise stated, it may be possible to electrolytically remove an adequate amount of heavy metals without resorting to manipulation of the metal chelate equilibrium by pH control After suitable residence time in tank 11, the aerobically digested and heavy metal-depleted sludge is separated from the electrolytic bath 18 by withdrawal through conduit 19.

FIG. 2 illustrates another embodiment of the invention featuring sequential aerobic digestion and electrolytic treatment in separate vessels. An activated sludge is introduced into tank 120 through conduit 110. In tank 120, aerobic bacteria in the sludge reduce the volatile solids content of the sludge. The contents of tank 120 are aerated and thoroughly mixed by mechanical agitator 112 in a manner well known to one of normal skill.

Preferably air or oxygen enriched gas is mixed into the sludge in tank 120 at a sufficient rate to dissolve at least 0.03 lb. of oxygen for each lb. of volatile suspended solids fed to tank 120. Additionally, the sludge in the aerobic digestion tank 120 is preferably maintained at a pH in the range of about 5–8 which is optimum for the activity of the aerobic micro-organisms therein. As stated previously, at pH levels below about 5, the activity of the aerobic bacteria is significantly reduced. Aerobically digested sludge is removed from tank 120 through conduit 121 at a rate controlled by valve 122. This sludge is then introduced into tank 123 for subsequent electrolytic treatment.

Tank 123 contains electrodes 113 and 114. These electrodes are connected to a source of direct current, as for example rectifier 117, through wires 115 and 116 respectively. Rectifier 117 is connected to an appropriate source of alternating current. Other sources of direct current can also be used, including storage batteries, as is obvious to one of normal skill. An electrolytic bath 118 is formed between the electrodes 113 and 114 upon the passage of direct current therethrough, heavy metals are deposited on the cathode 113 in elemental form.

The electrolytic bath 118 is maintained in an acidic condition, for example by the addition of a suitable acid through conduit 124 if necessary. Preferably, sufficient acid is added to the electrolytic bath 118 to maintain a pH in the range of 3–5. We have found that this pH range optimally maximizes the rate of metals removal.

The sludge in the electrolytic bath is also maintained in an aerobic condition by any suitable means. An aerobically digested and heavy metal-depleted sludge is separated from the electrolytic bath by passage through conduit 119.

In this invention, the term "aerobic" refers to a condition in which sufficient oxygen is or has been made available to the sludge organisms in the electrolytic bath to maintain a high level of soluble heavy metal species. Based on this consideration, and depending upon the degree of prior aerobic digestion of the sludge and the pH conditions of the electrolytic bath, any of three different criteria for aerobic conditions are appropriate depending on the specific oxygen uptake rate (SOUR) value, as determined by the procedure set forth hereinafter.

To determine SOUR the sludge to be treated is flowed through a small-scale test vessel at sufficient volumetric flow rate to obtain the predetermined sludge retention time selected for the aerobic digestion operation, which for the invention may typically be in the range of 4 to 48 hours, while contacting the sludge with a aeration gas containing at least 50 percent oxygen (by volume). The aeration is carried out so as to maintain a dissolved oxygen concentration (D.O.) of at least 2 mg/l in the sludge, as measured by any suitable D.O. probe of conventional type. During the aeration, sludge in the test vessel is maintained at 20° C. The foregoing test treatment of sludge, which may require dilution of the influent sludge to the test vessel with tap water in order to obtain the required D.O. level of at least 2 mg/l, is conducted until steady-state operation is achieved, which may require an extended period of operation of the test system as for example on the order of 5–7 days.

Upon the achievement of steady-state operation in the SOUR test system, a measured sample volume of sludge is withdrawn from the test vessel and, while maintained at the same temperature as previously existing in the test vessel, is rapidly aerated, as for example by intense agitation contacting of the sludge with aeration gas containing at least 50 percent oxygen (by volume), so as to raise the D.O. level of the aerated sludge to about 7.0 mg/l. At the point at which the D.O. level of approximately 7.0 mg/l is reached, aeration of the sample volume of sludge is terminated. Thereafter, during the subsequent decay of D.O. level in the sludge from the value of approximately 7.0 mg/l existing at the termination of aeration down to substantially negligible D.O. level, the time which is required for the D.O. to drop from a value of 6.0 mg/l down to 1.5 mg/l is measured. The oxygen uptake rate (OUR) of the sample volume of sludge is then computed by dividing the change in D.O. level during the period of measurement, i.e., 4.5 mg/l (= 6.0 mg/l − 1.5 mg/l), by the time which was required for the D.O. level to decline from 6.0 mg/l to 1.5 mg/l. From the resulting OUR value, the specific oxygen uptake rate (SOUR) is calculated by dividing the OUR value, having units of mg/l/time, by the volatile solids concentration of the sample volume of sludge, in g/l. The SOUR value as thus calculated has units of mg oxygen/time/g solids.

Returning now to the criteria for aerobic condition in the electrolytic bath they are as follows:

(1) If the sludge fed to the electrolytic bath has a SOUR measured at 20° C. of greater than about 0.8 mg $O_2$/hr/gVSS and the pH of the electrolytic bath is to be maintained between about 5–7, the bath should be aerated at a sufficient level to dissolve at least 0.03 gm. of oxygen for each gm. of volatile suspended solids in the sludge that is fed to the electrolytic bath.

(2) If the sludge fed to the electrolytic bath has a SOUR measured at 20° C. of greater than about 0.8 mg $O_2$/hr/gVSS and the pH of the electrolytic bath is to be maintained below about 5, a dissolved oxygen level of at least 0.1 mg/l is maintained in the sludge in the electrolytic bath.

(3) If the sludge fed to the electrolytic bath has a SOUR measured at 20° C. of less than 0.8 mg $O_2$/hr/gVSS regardless of the pH of the electrolytic bath (as long as it is acidic) it is not essential to add further oxygen to the bath. However, even in this case it is preferable to add oxygen to the bath to maintain a dissolved oxygen level of at least 0.1 mg/l, as we have found that the admission of oxygen into the bath increases the rate of heavy metals removal.

The electrolytic bath 118 may be maintained aerobic by bubbling air or oxygen therethrough. Alternatively, the voltage between the two electrodes 113 and 114 may be increased until sufficient oxygen is generated via electrolysis at the anode to maintain bath 118 aerobic. In some cases, the dissolved oxygen content of the stream fed to the electrolytic vessel may be sufficiently high to obviate the need for additional oxygenation means. Any combination of the above-mentioned three sources of oxygenation can be used to satisfy the oxygenation requirement of the bath.

FIG. 3 illustrates another embodiment of this invention in which an activated sludge is introduced into tank 220 through conduit 210, and aerobic bacteria reduce the volatile solids content of the sludge and oxidize the insoluble metal sulfides to soluble metal sulfates. In this embodiment, a portion of the aerobically digested and biochemically oxidized sludge is removed from tank 220 through conduit 221 and is passed by pumping means 226 into tank 223 for subsequent electrolytic treatment.

An electrolytic bath 218 is formed between the electrodes 213 and 214 and upon the passage of direct current therethrough, heavy metals are deposited on the cathode 213. The retention time of the sludge in tank 223 is independent of the retention time in the aerobic zone and is solely a function of the size of tank 223 and the flow rate of sludge in conduit 221. This retention time can be as low as a few minutes. The sludge in the electrolytic bath is maintained in an aerobic condition by any suitable means. After removal of the soluble heavy metals in tank 223, one portion of the sludge is returned to the aerobic digestion tank 220 through conduit 227 having control valve 228 therein while the other portion is removed through conduit 219. In tank 220, the sludge is digested and sufficient retention time for biochemical oxidation is provided as for example 10 days. This facilitates displacement of the metal chelates by protons and metal cations are released to the liquid phase in order to re-establish equilibrium conditions.

Besides being pH dependent, the rate of electrodeposition of heavy metals from a sludge slurry is also temperature dependent; higher temperatures yield higher rates. As a result, it is preferred to operate the aerobic digestion (biochemical oxidation) step at thermophilic temperatures, i.e., above about 45° C. To do this, the aerobic digestion tank is preferably covered and an oxygen-containing gas, preferably above 40% oxygen (by volume), is employed. By operating the aerobic digester at elevated temperature, it is much easier to maintain elevated temperatures in the electrolytic bath. Additionally, the thermophilic aerobic digestion step produces a pasteurized sludge (i.e., free of pathogenic organisms) and is more amenable to anaerobic digestion if such a step is to follow.

Referring now to FIG. 4, an embodiment of this invention employing thermophilic aerobic digestion together with electrolytic treatment will be described. This embodiment also includes a step of anaerobic digestion subsequent to the thermophilic aerobic digestion and electrolytic treatment steps. Finally, this embodiment illustrates a preferred method for integrating the thermophilic aerobic digestion with an activated sludge system employing oxygen-enriched vent gas from the aerobic digestion step as at least part of the aeration gas for the wastewater (secondary) treatment. Excess activated sludge produced during secondary treatment provides the sludge feed for the aerobic digestion step.

Aeration zone 350 receives influent wastewater through conduit 329, activated sludge through conduit 338 and an oxygen-enriched gas through conduit 330. The influent wastewater stream may for example, comprise an industrial, municipal, or a combination of industrial and municipal wastes. The aeration zone 350 comprises a covered reaction tank provided with a mechanical agitation means 331 for continuously recirculating oxygen-enriched gas against the waste liquid in tank 350. The design and operation of aeration zone 350 is preferably in accordance with any of the McWhirter U.S. Pat. Nos. 3,547,811; 3,547,812 or 3,547,815, incorporated herein to the extent pertinent. In aeration zone 350, aerobic bacteria are produced which reduce the oxygen demand of the sewage stream rendering it suitable for discharge into receiving waters. The treated mixed liquor is discharged from zone 350 and flows to gravity clarifier 334 through conduit 333. Purified water is discharged from the system through conduit 335 and may be subjected to conventional tertiary treatment steps. Activated sludge is removed from clarifier 334 through conduit 336, and a major portion thereof is returned to aeration zone 350 by pump 337 and conduit 338. Oxygen-depleted gas of preferably not less than 21% oxygen (by volume) is released from aeration zone 350 through vent means 332.

Since the activated sludge process is a net producer of bacteria, not all of the sludge separated in clarifier 334 is returned to aeration zone 350, and a small sludge fraction is discharged through conduit 339. This wasting process also suppresses the accumulation of inert material within the sludge recirculation loop. These materials normally enter the system with the wastewater stream and settle with the sludge bacteria in clarifier 334. Sludge wasting may comprise as much as 10% of the total separated sludge, but is typically about 3% (by volume). The sludge in conduit 339 is transported to the thermophilic aerobic digestion tank 320 by pumping means 340 and conduit 310.

An oxygen-enriched gas preferably comprising at least 80% oxygen (by volume) and sufficient in quantity to supply both the digestion and secondary waste treatment requirements, is introduced to covered tank 320 through conduit 341. The sludge flowing into tank 320 is mixed with oxygen-enriched gas by mechanical agitation means 312 at a sufficient rate to maintain aerobic digestion of the sludge. In order to sufficiently carry out the process of aerobic digestion, the sludge should preferably be mixed with the oxygen-enriched gas so as to dissolve at least 0.03 lb. of oxygen per each lb. of volatile suspended solids in the sludge fed to the covered tank 320. Unconsumed oxygen-containing aeration gas is discharged from tank 320 through valve means 345 and conduit 334. This gas supplies at least part of the oxygen requirement in wastewater aeration zone 350.

Preferably, the sludge in aerobic digestion tank 320 will reach and maintain thermophilic temperatures autothermally with the heat generated by the exothermic biochemical reactions occurring in tank 320. In some cases it may be necessary to either thicken the sludge or supply heat to the sludge prior to its introduction into tank 320. This heat can be provided by heat exchange between the influent and effluent strams. Alternatively, the sludge can be heated directly in tank 320 as for example by heating means 343. Still other means of maintaining thermophilic temperatures in tank 320 may also be employed as will be recognized by one of ordinary skill. Parameters influencing autothermal operation and methods for promoting it are described in Vahldieck U.S. Pat. No. 3,926,794 and U.S. Application Ser. No. 928,099 "Aerobic-Anaerobic Sludge Digestion Process" filed July 26, 1978 by M. S. Gould et al, both incorporated herein to the extent pertinent. Autothermal operation can be continuously maintained with aerobic retention times below about 48 hours. Preferably, the sludge retention time in the covered digestion tank 320 is limited to less than about 24 hours. Even at retention times below 24 hours, substantially complete pasteurization of the sludge and sufficient biochemical oxidation of the heavy metal sulfides are provided. The pasteurized sludge, preferably still containing at least 60% of the biodegradable volatile suspended solids content of the influent sludge, is then removed from tank 320 through valve 322 in conduit 321 and passed to tank 323 for subsequent electrolytic treatment. If needed, acid may be introduced to electrolytic tank 323 through conduit 370 and control valve 371 therein. Preferably, sufficient acid is added to the electrolytic bath 323 to maintain a pH in the range of 3-5. We have found that this pH range optimally maximizes the rate of metals removal.

Tank 323 contains electrodes 313 and 314. These electrodes are connected to a source of direct current, as for example rectifier 317, through wires 315 and 316 respectively. Rectifier 317 is connected to an appropriate source of alternating current. An electrolytic bath 318 is formed between the electrodes 313 and 314 and upon the passage of direct current therethrough, heavy metals are deposited on the cathode 313. The retention time of the sludge slurry in tank 323 is independent of the retention time in the aerobic zone and is solely a function of the size of tank 323 and the flow rate of sludge in conduit 321. The sludge in the electrolytic bath is maintained in an aerobic condition by any suitable means.

After removal of the soluble heavy metals in tank 323, one portion of the sludge slurry is returned to the thermophilic aerobic digestion tank 320 through conduit 325. The other portion of the heavy metal-depleted sludge is passed through conduit 319 to tank 348. The temperature of the sludge in conduit 319 is preferably above 50° C., reflecting the elevated temperature conditions existing in tank 320 and 323. Tank 348, which comprises an anaerobic digestion zone, is preferably operated at mesophilic temperatures. As a result, heat must usually be removed from the sludge slurry to ensure satisfactory operation of the digestion zone 348. Additionally, since it is well known that anaerobic digestion is very pH dependent, it is necessary to raise the pH of the sludge in conduit 319 by the addition of a suitable agent, for example lime, prior to treating the sludge in the digestion zone 348. The sludge slurry in conduit 319 is cooled in heat exchanger 360 and then passes through valve 347 into tank 348. The digestion tank 348 comprises a high rate mesophilic anaerobic digester, wherein the biochemical reactions occur in a covered digestion tank. For efficient operation, this tank is preferably maintained between 25° C. and 40° C. and preferably 37°–38° C. The contents of tank 348 are continuously mixed by mechanical agitation means 349, thereby creating a large zone of active decomposition and significantly increasing the rate of the stabilization reactions. Retention time for this stage of digestion will typically range between 5 days to 9 days. Methane-containing gas, produced as a result of the biochemical reactions occurring in tank 348, is removed through conduit 350 and flow control valve 351. The stabilized sludge, now containing no more than 40% of the original biodegradable volatile solids content of the influent sludge and preferably no more than 20%, is discharged through conduit 352 to final disposal, e.g., land spreading.

A problem associated with conventional anaerobic digestion systems is the susceptibility of the methane-forming bacteria to the presence of toxic heavy metals such as cadmium and zinc. Even very small quantities of these metals are believed to inhibit the activity of the methane-formers. After the steady input of a toxic the acid-forming bacteria begin to dominate thereby producing an excess of the acidic intermediate products of decomposition which in turn lowers the pH and further inhibits the activity of the methane-forming bacteria. This cascading effect inevitably leads to a severe upset.

The typical solution for this condition is the addition of large quantities of lime in an attempt to increase the buffering and thus raise the pH. This solution may be satisfactory if the digester has received an abrupt load or some inhibitory material that can be flushed out or assimilated. By increasing the pH and decreasing the sludge feed, it is sometimes possible to bring the digester back into operation. However, if the cause for digester upsets is the constant and prolonged input of a toxin, lime treats only the symptoms but does not cure the digester problem.

Through the integration of the thermophilic aerobic stage and metals removal with the anaerobic digester as illustrated by FIG. 4, the instability of conventional high rate anaerobic digester operation due to toxic heavy metals is eliminated significantly improving the operation and methane producing capability of the anaerobic digester.

Another substantial benefit provided by the integrated system or FIG. 4 (beyond that attributable to elimination of toxic metals) is its ability to handle a sporadic upset, such as a shock load. In a conventional anaerobic digester not only does the initial solubilization occur rapidly, but microbial utilization of this material by the mesophilic and facultative acid-forming bacteria also occurs at a high rate. At the incidence of a sudden high substrate loading, solubilization and acidification occur at a faster rate than the methane-forming bacteria can use the acidic intermediate products. Therefore, the pH falls and a sour digester results. In the FIG. 4 embodiment, however, the thermophilic aerobic stage not only promotes a rapid solubilization but also tends to reduce the population of the mesophilic acid-forming bacteria. Subsequently, the anaerobic state allows the regrowth of these organisms, more in balance with the growth of the methane-forming organisms. Therefore, at the incidence of a shock loading to the aerobic stage, rapid solubilization occurs as well as stabilization of the most volatile portion of the sludge, thereby smoothing out the shock and greatly diminishing its affect on the anaerobic state.

A series of experiments were performed which illustrate the practice of this invention.

The activated sludge used in these tests was obtained from the air aerated secondary wastewater treatment plant at Lockport, N.Y. The sludge was aerobically digested in covered 14-gallon vessels using high purity oxygen aeration gas and mechanical agitation, for a continuous period of five full days (each 24 hours), as for example illustrated by tank 320 in FIG. 4. The sludges were digested under two different conditions: (a) digestion without pH adjustment and (b) digestion at a controlled pH of 6.0 with daily addition of dilute sulphuric acid to the digestion.

The aerobically digested sludge was transferred in quantities of about one liter to a two liter capacity beaker in which electrodes were placed. The electrodes were rectangular plates 5.1 cm. long×15.2 cm. wide×0.08–0.20 mm thick. The cathodes were made from the following materials: aluminum, copper, and porous carbon. The anodes were made of graphite and aluminum. The electrodes dipped into the aerobically digested sludge slurry as the electrolytic bath, kept well mixed with the aid of a mechanical stirrer. The distance between the electrodes in the different experiments varied between 0.6 and 5.0 cm. Direct current was passed through the electrolytic bath; the voltage was maintained constant at 3 volts and the current densities ranged from 0.01 to 0.36 ampere per square decimeter.

The total solids content of the sludge slurries used in the experiments ranged from 0.76 to 2.5 percent. Before commencing electrolysis, the pH values of the sludge slurries were lowered to 4.0, 5.0 and 6.0 by addition of varying amounts of 1 N sulphuric acid. In some of the experimental runs, pH value of the sludge slurry was controlled by periodic addition of sulfuric acid. Experimental runs were made at room temperature (about 23° C.) and at a temperature of about 50° C. which is suitable for thermophilic digestion as illustrated in FIG. 4. In order to maintain the elevated temperature during electrolysis the container was placed on a hot plate.

The data from the aforedescribed experiments is summarized in Table A. In general, digestion of the activated sludge and biochemical oxidation of insoluble heavy metal sulfides to soluble sulfate appeared to proceed satisfactorily in both the controlled pH and the uncontrolled pH tests.

The performance of this invention with respect to heavy metals removal is dependent on a variety of parameters including current density, time, temperature, pH, electrode material and various geometric and fluid flow considerations. The heavy metals removed from the sludge slurry electrolytic bath were deposited on the cathodes as dark powdery material. Metal slough-off from the cathodes occurred in all runs with copper and aluminum cathodes.

An unexpected advantage discovered during the testing of this invention is the favorable influence of electrolytic treatment employing aluminum anodes on the settling properties of the sludge solids in the slurry. In such cases, the aerobically and electrochemically treated sludge slurries, when allowed to settle, easily separated into two distinct phases.

During electrolytic treatment, the aluminum anodes dissolve into the aerobically treated sludge electrolytic bath and serve as a coagulant thereby improving the settling properties of the heavy metal depleted sludge. Another advantage of using aluminum as the anode is that the aluminum ions dissolved in the electrolytic bath also bind with phosphate, if present in the liquid phase of the sludge, to form insoluble aluminum phosphate. This is desirable as phosphates are generally considered to be wastewater contaminants and should be removed. This is often accomplished by the addition of alum but the aluminum-phosphate reaction rate is faster since the aluminum cations are immediately available.

As previously mentioned, there was metal slough-off from the aluminum and copper cathodes during these tests, so that the analytical results of sludge slurry in Table A include the heavy metals initially deposited on the cathode and returned to the sludge. The metal removal efficiency may be improved by use of electrode systems in which the metals removed by electrolysis do not slough off and re-enter the sludge slurry. Possible means for accomplishing this include fine mesh fabric such as cloth bags enclosing the cathode as for example fiberglass cloth which should be able to withstand abrasion and high temperature.

Another pair of experiments were performed which illustrate the importance of the aerobic biochemical oxidation step. The activated sludge was obtained from the same Lockport, New York, wastewater treatment plant. The sludge quantity used and the test equipment were the same as in the previously described experiments except that in this experiment, the cathodes were enclosed with a nylon-mesh bag. In experiment No. 8 the sludge was aerobically digested for 5 days at 50° C. prior to electrolysis and in the Experiment No. 9 there was no aerobic digestion. The experimental conditions were otherwise substantially identical and the results are summarized in Table B. Comparison of the metal concentrations before and after electrolysis reveals that with aerobic digestion substantial quantities of most heavy metals were removed whereas without this step there was no heavy metal removal of significance. The nominal increase in metals concentrations in Experiment No. 9 for several of the metals is discounted as experimental inaccuracies. The general conclusion is that heavy metals are not deposited on the cathode if the sewage sludge is not first biochemically oxidized.

Table A

| Exmpt No. | Cathode (Number)* | Anode (Number)* | Current Density (amp/dm$^2$) | Electrolysis Time (hrs) | Temp (°C.) | pH | | Cu | Cr | Cd | Ni | Fe | Zn | Pb | Current Efficiency (%) |
|---|---|---|---|---|---|---|---|---|---|---|---|---|---|---|---|
| | | | | | | | | Metal Concentrations (mg/kg dry solids) | | | | | | | |
| 1 | Copper (4) | Graphite(2) and Aluminum(3) | 0.01 | 24 | 23 | 6.0 | Before: | 2032.2 | 1327 | 42.3 | 896 | 42325 | 12348 | 819 | |
| | | | | | | | After: | 1037.3 | 1058 | 35.9 | 720 | 34575 | 9738 | 663 | |
| | | | | | | | Removal Eff: (%) | 49.0 | 20.3 | 15.1 | 19.6 | 18.3 | 21.1 | 19.1 | 28.0 |
| 2 | Copper (4) | Graphite(2) and Aluminum(3) | 0.03 | 18 | 23 | 4.5 | Before: | 2228 | 1519 | 46.2 | 1023.8 | 50589 | 13517 | 883 | |
| | | | | | | | After: | 1467 | 836 | 28.1 | 532.1 | 28261 | 8247 | 532.1 | |
| | | | | | | | Removal Eff: (%) | 34.2 | 45.0 | 39.2 | 48.0 | 44.1 | 39.0 | 39.7 | 14.7 |
| 3 | Copper (1) | Aluminum (2) | 0.03 | 24 | 23 | 4.0 | Before: | 2337 | 1673 | 44.9 | 963.3 | 48815 | 13929 | 898 | |
| | | | | | | | After: | 1335 | 1013 | 27.6 | 575.3 | 29158 | 8216 | 575.3 | |
| | | | | | | | Removal Eff: (%) | 42.9 | 39.5 | 38.5 | 40.3 | 40.3 | 41.0 | 35.9 | 46.3 |
| 4 | Aluminum (1) | Graphite (2) | 0.03 | 24 | 50 | 5.0 | Before: | 1923 | 1718 | 51.9 | 1037 | 47969 | 12208 | 897 | |
| | | | | | | | After: | 1572 | 1231 | 40.7 | 805 | 41383 | 9470 | 739 | |
| | | | | | | | Removal Eff: (%) | 18.3 | 28.4 | 21.6 | 22.4 | 13.7 | 22.4 | 17.6 | 14.4 |
| 5 | Porous Carbon (2) | Graphite(2) and Aluminum(1) | 0.06 | 24 | 50 | 4.0 | Before: | 1767 | 1469 | 71.5 | 1499 | 52919 | 12014 | 715 | |
| | | | | | | | After: | 718 | 902 | 51.1 | 917 | 39116 | 9178 | 429 | |
| | | | | | | | Removal Eff: (%) | 59.5 | 38.6 | 28.5 | 38.8 | 26.1 | 23.6 | 40 | 23. |
| 6 | Porous Carbon(2) and Aluminum (1) | Graphite(2) and Aluminum(2) | 0.25 | 5 | 50 | 4.0 | Before: | 1760 | 1686 | 84.1 | 1674 | 46362 | 13751 | 754 | |
| | | | | | | | After: | 1057 | 1043 | 53.9 | 1057 | 36392 | 9015 | 503 | |
| | | | | | | | Removal Eff:(%) | 39.9 | 38.1 | 35.9 | 36.9 | 21.5 | 34.4 | 33.3 | 36.3 |
| 7 | Porous Carbon (2) | Graphite (2) | 0.09 | 22 | 50 | 5.0 | Before: | 1442 | 1545 | 79.6 | 1667 | 55150 | 11423 | 674 | |
| | | | | | | | After: | 1211 | 1341 | 70.9 | 1430 | 46441 | 10786 | 642 | |
| | | | | | | | Removal Eff:(%) | 16.0 | 13.2 | 10.9 | 14.2 | 15.8 | 5.6 | 4.8 | 19. |

*Number of electrodes used

TABLE B

| Expmt. No | Cathode (Number) | Anode (Number) | Current Density (amp/dm²) | Electrolysis Time (hrs) | Temp. (°C.) | pH | | Cu | Cr | Cd | Ni | Fe | Zn | Pb |
|---|---|---|---|---|---|---|---|---|---|---|---|---|---|---|
| 8 | Brass(2) | Graphite (3) | 0.19 | 24 | 50 | 5.5 | Before: | 2443 | 1523 | 39.7 | 1466 | 42564 | 7507 | 722 |
|   |          |              |      |    |    |     | After:  | 1666 | 1376 | 27.2 | 858  | 41965 | 3641 | 709 |
|   |          |              |      |    |    |     | Removal Eff.(%) | 31.8 | 9.6 | 31.5 | 41.5 | 1.4 | 51.5 | 1.8 |
| 9 | Brass(2) | Graphite (3) | 0.145 | 24 | 50 | 5.5 | Before: | 2422 | 1177 | 38.1 | 1228 | 33023 | 6027 | 673 |
|   |          |              |       |    |    |     | After   | 2894 | 1399 | 48.4 | 1357 | 31881 | 7050 | 726 |

Another series of tests were conducted which demonstrate the effect of aerobic digestion retention time on metals removal. The Lockport, N.Y. sludge was aerobically digested in covered 14 gallon vessels using high purity oxygen aeration gas and mechanical agitation for the duration cited in the tabulated results (Table C). The sludge was digested without pH adjustment. The aerobically digested sludge was then transferred to the sludge demetallizing system consisting of a 7 liter reactor vessel and a holding beaker. The holding beaker contained the pH probe and was the location for acid addition for pH control. Sludge being treated was continuously recycled from the reactor through the holding beaker and then back into the reactor. The electrodes were rectangular plates; the anodes were graphite slabs 33 cm. long, 7.6 cm. wide, and 0.64 cm. thick wide and the cathodes were aluminum sheets 51 cm. long, 4.4 cm. wide, and 0.16 cm. thick. The electrodes, 4 anodes and 5 cathodes, were alternatively spaced. The distance between the electrodes in the different experiments was maintained constant at about 0.95 cm.

During the course of the experiments, direct current was passed through the electrolytic bath between the electrodes and the voltage was varied between about 2 and 3 volts. The current was observed to fluctuate between about 0.8 and 3.1 amps. In addition, oxygen-enriched gas (99.5% oxygen by volume) was bubbled through the electrolytic bath at the rate of 5 scf per hour for the duration of each test.

Total solids content of the sludge slurries used in the experiments ranged from about 2.7% to 5.3%. Before commencing electrolytic treatment, the pH values of the sludge slurries were initially lowered to between about 3.0 and 4.0 by the addition of varying amounts of sulphuric acid. In some of the experimental runs, the pH value of the sludge was controlled by periodic addition of acid, while in other experimental runs the pH was not controlled. The experimental runs were made at approximately the same temperature as the step of aerobic digestion, i.e. at both 50° C. and 25° C. In order to maintain the elevated temperature during electrolytic treatment, the electrolytic vessel was heated by two aquarium heaters.

Data from the before mentioned experiments is summarized in Table C. The values for pH, voltage, current, temperature, and total solids reported in Table C represent values averaged over the duration of electrolytic treatment. Experiment Nos. 10-13 were conducted at 50° C., while experiment Nos. 14-16 were conducted at 25° C. Only an analysis of the cadmium and zinc content of the sludge are presented, since these are the key elements to be removed prior to land disposal of sludge.

From the results of experiment No. 10, one notices that surprisingly high levels of metals removal is accomplished with a short aerobic digestion step (12 hours) followed by a short electrolytic treatment step (6 hours). Comparing the results of experiment Nos. 11 and 12 with experiment No. 10, one may conclude that the lengthening of the digestion step produces only a small increase in the degree of metals removal at this temperature. One should note that experiment No. 12 was conducted for only 4 hours, while Nos. 10 and 11 were conducted for 6 hours; this explains the seemingly lower level of removal reflected in experiment 12.

The aerobic digestion and electrolytic treatment in experiment Nos. 13-16 were conducted at 25° C. Comparison of these tests with experiment Nos. 10-12 gives a general indication of the increase in the kinetics of metals removal attributable to temperature. In experiment No. 14 there was no aerobic digestion, and comparison with experiment Nos. 15 and 16 illustrates the improvement in the degree of metals removal which can be gained from the practice of this invention. These longer retention time experiments may also be compared with the data presented in Tables A and B, in which the electrolytic bath was probably at a lower state of aerobiosis. It should be noted that such a comparison is only qualitative as several parameters in the various experiments differ significantly.

TABLE C

| Experiment No. | Aerobic Digestion | | | Electrolytic Bath | | | | Total Solids (mg/l) | Metals Concentration (mg/kg Dry Solids) | | | | | |
| | Retention Time (Hrs.) | Temperature (°C.) | pH | Voltage (D.C.) | Current (Amps) | Temperature (°C.) | Retention Time (Hrs.) | | Cadinum | | | Zinc | | |
| | | | | | | | | | (Before) | (After) | (% Removal) | (Before) | (After) | (% Removal) |
|---|---|---|---|---|---|---|---|---|---|---|---|---|---|---|
| 10 | 12 | 50 | 4.0 | 2.9 | 2.2 | 51 | 6 | 42,645 | 72.4 | 13.5 | 81.4 | 11.939 | 4.855 | 59.3 |
| 11 | 36 | 50 | 3.8 | 2.6 | 3.1 | 50 | 6 | 27,671 | 120.6 | 10.2 | 91.5 | 20,816 | 8.978 | 56.9 |
| 12 | 60 | 50 | 3.8 | 2.8 | 2.2 | 48 | 4 | 45.835 | 56.2 | 32.4 | 42.4 | 12,411 | 9.062 | 27.0 |
| 13 | 84 | 50 | 4.2 | 2.8 | 1.9 | 47 | 6 | 52,786 | 62.6 | 45.5 | 27.3 | 11.076 | 10,559 | 4.7 |
| 14 | 0 | — | 3.6 | 3.0 | 1.2 | 25 | 7 | 36,521 | 60.0 | 47.6 | 20.7 | 12,660 | 9.819 | 22.4 |
| 15 | 42 | 25 | 3.6 | 3.0 | 1.0 | 25 | 9 | 32,692 | 83.1 | 33.3 | 59.9 | 17.075 | 9.108 | 46.7 |
| 16 | 66 | 25 | 3.9 | 3.0 | 0.8 | 25 | 9 | 31,596 | 64.7 | 19.2 | 70.3 | 13,547 | 5,963 | 56.0 |

Still another series of tests using the Table C apparatus was performed in which the specific oxygen uptake rate of the sludge (SOUR) was measured after aerobic digestion but before acid addition (pH of 7), as well as after acid addition but prior to electrolytic treatment (pH of 4). During the electrolytic treatment step, nitrogen was bubbled through the bath at a rate of 5 scf per hr. for the duration of each experiment. This was done to minimize possible hydraulic differences between the Table C test results during which oxygen was bubbled through the bath, and the current experiments summarized in Table D.

From the Table D data it can be seen that depressing the pH of the sludge to below about 5 causes aerobic activity to cease. Accordingly, regardless of the specific oxygen uptake rate of the sludge prior to acid addition, there should be no difficulty in maintaining a dissolved oxygen level in the sludge during the electrolytic treatment. For this reason, it is preferable to maintain a dissolved oxygen level of at least 0.1 mg/l when the pH of the electrolytic bath is below about 5. However, if the pH of the electrolytic bath is above 5 as would be required in the FIG. 1 single tank embodiment, then there is sufficient aerobic activity to justify oxygenation under certain circumstances.

As for example shown by Experiment Nos. 20 and 21, if sufficient aerobic digestion has been previously performed for a reduction in the SOUR to below about 0.8 mgO$_2$/hr/gmVSS, then heavy metals can be removed from the sludge without any additional aerobic treatment. Nonetheless, oxygenation of the electrolytic bath has been shown to increase the rate of metals removal even in this condition as exemplified by a comparison of experiment No. 16 and the data in Tables A and B.

As shown by experiment Nos. 17–19, if the SOUR of the aerobically digested sludge is above 0.8 mgO$_2$/hr/gmVSS then the absence of oxygenation of the electrolytic bath results in little or no heavy metals removal. Accordingly, in this condition the electrolytic bath must be aerated. However, the ease of maintaining a dissolved oxygen level is influenced by the pH level of the electrolytic bath. As a result, a dissolved oxygen level criteria cannot be universally applied to the embodiment wherein the sludge fed to the electrolytic bath has a SOUR above 0.8 mgO$_2$/hr/gmVSS. If the pH of the sludge in the electrolytic bath is below about 5, then it is relatively easy to maintain a dissolved oxygen level and a lower limit of 0.1 mg/l is suitable. If the pH level of the sludge is above about 5 then the aerobic activity may make it difficult to maintain a measurable dissolved oxygen level and in this operating mode at least 0.03 gm of oxygen are dissolved into the electrolytic bath for each gm of volatile suspended solids fed to the bath. Notwithstanding the foregoing, if possible it is preferable to maintain a measurable dissolved oxygen level in the electrolytic bath.

Although preferred embodiments have been described in detail, it will be appreciated that other embodiments are contemplated with modification of the disclosed features, as being within the scope of the invention.

What is claimed is:

1. A method for removal of heavy metals from activated sewage sludge comprising: aerating the activated sewage sludge with oxygen-containing gas as the sole source of oxygen to biochemically oxidize the heavy metal sulfides to the soluble sulfate form; establishing and maintaining a voltage difference between a cathode and an anode in the soluble heavy metal sulfate-containing sludge as an electrolytic bath; maintaining said bath in an acidic and an aerobic condition and depositing heavy metals at the cathode; and separating aerated and heavy metal-depleted sludge from said electrolytic bath.

2. A method according to claim 1 in which the pH of the sludge during the biochemical oxidation is between about 5 and 8.

3. A method according to claim 1 in which the biochemical oxidation and heavy metal deposition are in the same zone.

4. A method according to claim 1 in which the biochemical oxidation and heavy metal deposition are in separate zones.

5. A method according to claim 1 in which the biochemical oxidation is in the first zone with a relatively long retention time, the heavy metal deposition is in a second zone with a relatively short retention time, and one portion of the heavy metal depleted sludge from the second zone is returned to the first zone.

6. A method according to claim 3 in which the pH of the sludge during biochemical oxidation and heavy metal deposition is between about 5 and 7.

7. A method according to claim 1 in which the biochemical oxidation is at temperature of at least 45° C.

8. A method according to claim 1 in which the heavy metal-depleted sludge from the electrolytic bath is anaerobically digested.

9. A method according to claim 1 in which the soluble heavy metal sulfate-containing sludge has a specific oxygen uptake rate (SOUR) at 20° C. of greater than 0.8 mgO$_2$/hr/gmVSS, the pH of the electrolytic bath is maintained between 5 and 7, and the electrolytic bath is aerated at sufficient level to dissolve at least 0.03 gm. of oxygen per gm. of volatile suspended solids (VSS) in the sludge.

10. A method according to claim 1 in which the soluble heavy metal sulfate-containing sludge has a specific oxygen uptake rate (SOUR) at 20° C. of greater than 0.8 mgO$_2$/hr/gmVSS, the pH of the electrolytic bath is maintained below 5, and the electrolytic bath is aerated

TABLE D

| | Aerobic Digestion Temperature = 50° C. | Electrolytic Bath pH = 4.0 Voltage = 3.0 Volts D. C. Temperature = 50° C. Retention Time = 6 Hrs. Solids (TSS/VSS) = 5.2%/2.6% | | | | | | |
|---|---|---|---|---|---|---|---|---|
| | Aerobic Digestion | | Electrolytic Bath | | | | | |
| Experiment No. | Retention Time (Days) | Specific Oxygen Uptake Rate (mgO$_2$/hr/gVSS) | Specific Oxygen Uptake Rate (mgO$_2$/hr/gVSS) | Cadmium (mg/kg Dry Solids) | | | Zinc (mg/kg Dry Solids) | | |
| | | | | Before | After | % Removal | Before | After | % Removal |
| 17 | 1 | 1.77 | ~0 | 44.8 | 44.5 | 0.67 | 9,002 | 9,838 | −9 |
| 18 | 3 | 5.69 | ~0 | 43.9 | 43.4 | 1.14 | 11,537 | 8,934 | 22.5 |
| 19 | 5 | 1.15 | ~0 | 46.0 | 44.2 | 3.91 | 12,337 | 10,402 | 15.7 |
| 20 | 9 | <0.8 | ~0 | 43.3 | 9.8 | 77.4 | 11,036 | 3,431 | 68.9 |
| 21 | 10 | <0.8 | ~0 | 40.5 | 7.6 | 81.2 | 10,307 | 4,221 | 59.9 | at sufficient level to maintain at least 0.1 mg/l dissolved oxygen in the sludge.

11. A method according to claim 1 in which the soluble heavy metal sulfate-containing sludge has a specific oxygen uptake rate (SOUR) at 20° C. of less than 0.8 $mgO_2/hr/gm$ VSS, and the electrolytic bath is aerated at sufficient level to maintain at least 0.1 mg/l dissolved oxygen in the sludge.

* * * * *